United States Patent
Azima et al.

(10) Patent No.: US 6,324,294 B1
(45) Date of Patent: *Nov. 27, 2001

(54) PASSENGER VEHICLES INCORPORATING LOUDSPEAKERS COMPRISING PANEL-FORM ACOUSTIC RADIATING ELEMENTS

(75) Inventors: Henry Azima, Cambridge; Martin Colloms, London; Christien Ellis, Hertfordshire, all of (GB)

(73) Assignee: New Transducers Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/398,057

(22) Filed: Sep. 17, 1999

Related U.S. Application Data

(63) Continuation of application No. PCT/GB98/00835, filed on Mar. 19, 1998, and a continuation-in-part of application No. 08/707,012, filed on Sep. 3, 1996, and a continuation-in-part of application No. 09/029,349, filed as application No. PCT/GB96/02157 on Sep. 2, 1996.

(30) Foreign Application Priority Data

Mar. 22, 1997 (GB) .................................................. 9705979

(51) Int. Cl.[7] .................................................. H04R 25/00
(52) U.S. Cl. ........................ 381/381; 381/87; 381/398; 381/431; 181/287; 181/288; 181/292
(58) Field of Search ................................. 381/302, 86, 87, 381/389, 431; 181/287, 292, 288, 1

(56) References Cited

U.S. PATENT DOCUMENTS

| 3,247,925 | 4/1966 | Warnaka | 181/31 |
|---|---|---|---|
| 3,347,335 | 10/1967 | Watters | 181/5 |
| 4,326,100 | * 4/1982 | Polacsek | 179/1 VE |
| 4,392,027 | 7/1983 | Bock | 179/181 W |
| 4,514,599 | 4/1985 | Yanagishima | 179/181 W |
| 4,807,294 | * 2/1989 | Iwata | 381/190 |
| 5,094,316 | * 3/1992 | Rosen | 181/141 |
| 5,901,231 | * 5/1999 | Parella | 381/86 |

FOREIGN PATENT DOCUMENTS

| 36 03 198 | 10/1986 | (DE) . |
|---|---|---|
| 43 28 720 | 3/1995 | (DE) . |
| 196 38 189 | 3/1997 | (DE) . |
| 0 411 786 | 2/1991 | (EP) . |
| 2 281 836 | 3/1995 | (GB) . |
| 4-97700 | 3/1992 | (JP) . |
| WO 92/03024 | 2/1992 | (WO) . |
| WO 97/09858 | 3/1997 | (WO) . |
| WO 97/09859 | 3/1997 | (WO) . |
| WO 97/09861 | 3/1997 | (WO) . |
| WO 98/13942 | 4/1998 | (WO) . |

* cited by examiner

Primary Examiner—Curtis Kuntz
Assistant Examiner—Dionne N. Harvey
(74) Attorney, Agent, or Firm—Foley & Lardner

(57) ABSTRACT

A vehicle having a passenger compartment with a moulded headlining to which an exciter is coupled and together forming a distributed mode acoustic radiator, the headliner providing a bass acoustic response when resonating. A mid/high frequency acoustic radiator also may be carried by the headlining. Other interior components of the vehicle (seats, door panels, visors, etc.) also may comprise acoustic radiators.

11 Claims, 3 Drawing Sheets

US 6,324,294 B1

PASSENGER VEHICLES INCORPORATING LOUDSPEAKERS COMPRISING PANEL-FORM ACOUSTIC RADIATING ELEMENTS

This application is a continuation of International application No. PCT/GB98/00835, filed Mar. 19, 1998; a continuation-in-part of U.S. application Ser. No. 08/707,012, filed Sep. 3, 1996; and a continuation-in-part of U.S. application Ser. No. 09/029,349, filed Sep. 2, 1996, as International application No. PCT/GB96/02157.

TECHNICAL FIELD

The invention relates to passenger vehicles and more particularly to passenger vehicles incorporating loudspeakers comprising panel-form acoustic radiating elements.

BACKGROUND ART

Embodiments of the present invention use members of nature, structure and configuration achievable generally and/or specifically by implementing teachings of our parent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for exciter means, particularly operationally active or moving part(s) thereof effective in relation to acoustic vibrational activity in said area(s) and signals, usually electrical, corresponding to acoustic content of such vibrational activity.

Members as above are herein called distributed mode acoustic radiators and are intended to be characterised as in the above parent application Ser. No. 08/707,012 and/or otherwise as specifically provided herein.

This invention is particularly concerned with acoustic devices in the form of resonant acoustic radiator loudspeakers for use in passenger vehicles such as automobiles, aircraft, boats, railway trains etc, and to vehicles incorporating such loudspeakers.

DISCLOSURE OF INVENTION

The invention is a vehicle having a passenger compartment characterised by a loudspeaker in the passenger compartment comprising a distributed mode acoustic radiator and an exciter mounted on the radiator to vibrate the radiator to cause it to resonate.

The radiator may be integral with a passenger seat in the vehicle or with a door into the passenger compartment. The radiator may be integral with the interior of the passenger compartment, e.g. a wall, floor or roof. Thus the radiator may be integral with a roof lining in an automobile or the like. A plurality of such radiators may be arranged in the vehicle.

The vehicle may comprise a plastics or fibrous moulded component in or forming part of the passenger compartment, and the radiator may be integral with the component.

The radiator may comprise a stiff lightweight panel having cellular core sandwiched between skin layers, and wherein one of the skins is integral with the moulded component. The said one skin may be thin in comparison to the average wall thickness of the component. The said one skin may be surrounded by a groove or slot in the component, the groove defining a resilient surround for the radiator, and the slot helping to define a region of distributed mode bending operation.

From another aspect, the invention is a vehicle component comprising a loudspeaker having a distributed mode acoustic radiator and an exciter mounted on the radiator to vibrate the radiator to cause it to resonate.

Employing the principle for the distributed mode loudspeaker described in our parent application Ser. No. 08/707,012, it is possible to employ suitable existing structures, directly or by adaptation or modification, or by original design, to operate as effective loudspeakers.

Distributed mode operation indicates that a beneficial spread of modal resonances be encouraged in a structure intended to operate as an acoustic radiator. The principle teaches properties of structure, geometry and driving point(s) which promote good modal density for wide range sound reproduction. Some structures e.g. existing or prefabricated or similar panels may naturally have such a property in the frequency range of interest, for which a suitable mathematical and mechanical analysis will determine the optimum driving point(s) and exciter(s) and their characteristics for a useful acoustic output.

Obviously where existing or installed structures are appropriate there is potentially high convenience, utility and decorative value and additionally a cost benefit for additional operation/inclusion of a loudspeaker, whether for music or speech application for example hands-free mobile telephony to enhance safety. Such class of speaker provides weight saving and/or greater impact safety for the vehicle occupants.

Subject to structural and acoustic analysis including the effect of the potential air load, an existing interior door panel or parcel shelf or equivalent or roof lining may benefit from modification to its mountings or the addition of stiffening members, sections or panels, to result in a performance closer to the intended distributed mode form, in the intended range of operation.

Alternatively these panel units, compatible or otherwise with existing practice, may be structured and designed to possess distributed mode potential for general vehicular interiors even having the dimensions of small rooms e.g. rail coaches, buses etc. according to the principles described in parent application Ser. No. 08/707,012.

For automotive use the distributed mode principle is particularly suited since the acoustic element may be robust, water and environmentally resistant and requires no grill cover or opening, or protection for its effective operation. In fact the acoustic part of the panel may be fully integrated such that no external witness of its presence is required this also for interior design where the visual presence of loudspeaker systems is to be avoided.

Where sound systems are incorporated in vehicles, the distributed mode principle allows them to be fully integrated in prefabricated units including related services such as rooflights and related control and display technology served by as little as one wiring harness for reduced assembly cost. In additional the integration of more advanced facilities in, for example, a vehicle roof lining, adds engineering value to this product.

While distributed mode speakers are capable of, and are generally designed to operate over, a wide frequency range, in particular uniquely to reach to the highest audible frequencies without the use of additional drive elements or crossover networks, some panel structures lend themselves to effective operation in the lower frequency range owing to their relatively low fundamental bending frequency. While employing built-in or otherwise distributed mode speaker elements for the usual middle and upper frequency range, the naturally low bending frequency(s) for the structural or modular panels in question may be utilised for sound reproduction which is optimised in the low frequency range to work congruently with the upper range units. The result is a beneficial additional operation of such panel as dual purpose while the low frequency range may extend into the range generally covered by box type units called subwoofers, characterised by operation in the range below 150 Hz and which may extend down to audible 20 Hz limits or thereabouts, this lower limit still sensed by human perception and capable of enhancing the enjoyment of reproduced music signals of wide recorded bandwidth. Larger structural panels of heavier construction of resin bonded composites of combinations of these and similar material will have modal resonances extending to the low range and may be driven by a number of electromagnetic energisers including those designed specifically to suit distributed mode loudspeakers as described in our copending application Ser. Nos. 09/011,773, 09/011,770 and 09/011,831 optimised by driving force and natural resonance to couple well to larger heavier panels.

The integration of sound systems with vehicle design, also with lighting units is an important aspect of modern practice. The distributed mode speaker principle is uniquely suited to these applications where unobtrusive even totally concealed sound systems may be designed. Full range types of loudspeakers, resonant panel or otherwise, may be augmented by resonating distributed mode panels which are designed to be effective in the low range. Low range sounds are essentially non directional which largely removes restraints on placement. Thus low range distributed mode panels may be positioned advantageously under seating in a protected area or incorporated in the under panelling of the seat.

Vehicle components which are suited to low frequency operation with electrodynamic exciters include parcel shelves, headlinings and door interior panels.

The structure of a headlining may be multi-layer, with a resinated fibre structural base overlaid by an acoustically porous thin foam and a fabric or other decorative covering. In one embodiment the headlining base is perforated by one or more apertures in which small distributed mode speakers may be resiliently supported to provide one or more channels of sound reproduction conveniently above the passengers heads, the sound easily being transmitted through the porous layer. These separate distributed mode speakers are more suited to the middle and upper frequency range and the low range is then preferably reproduced by resonating the structure of the headlining with a suitable electrodynamic exciter. The particular virtue of a distributed mode speaker in this design is the lack of hot spot or proximity effect and which provides superior sound distribution for the vehicle passengers.

In manufacture, small distributed mode speakers may be moulded into place in a headlining or the like to simplify construction. To avoid the possibility of power overload, and the consequent need for repair, thermal limiters, e.g. self resetting positive temperature co-efficient resistors, may be incorporated in the wiring harness to protect the exciters.

A loudspeaker according to the present invention may be incorporated in a conventional vehicle using, for example, existing or partially modified surfaces, or by moulding and suitable attachment of a distributed mode loudspeaker panel to the different linings and trimmings of the vehicle, for example in panels of the headrest remote from occupant head contact.

A distributed mode acoustic radiator designed to operate at low frequencies, i.e. a subwoofer, may be positioned in places such as the under-seat area or in seat backs, and might also be applied to the whole of a headlining of suitable stiffness.

Mid-high frequency sound reproduction can be achieved by employing distributed mode loudspeaker panels attached to or installed in the vacuum-forming or other moulding process of the internal trimmings, in particular the headliner, the door-liner, parcel-shelf, sun visor or the dashboard of an automobile.

Bass frequencies can be produced by applying a suitable exciter to a headliner or rear parcel-shelf and/or by the use of separate distributed mode panels that are attached to the undersides of seats, to the rears of seats or door linings or even to floor coverings. In a particular application, the vehicle foot-well can be utilised to amplify the bass frequencies as a horn for panel radiators mounted in such a location. When the speakers are proximate to the heads of the passengers, especially in the headliner or headrest applications, noise cancellation of good order of bandwidth and rejection ratio may be achieved as an additional benefit in conjunction with suitable signal processing systems, known per se.

Due to very wide dispersion characteristics of distributed mode loudspeakers and the diffuse nature of the sound, an even sound distribution is achieved in the vehicle cabin with good signal to noise ratio. Further enhancement of the 'tonal balance' and also 'dynamic road noise reduction' i.e. noise cancellation may be achieved by DSP (digital signal processing) methods due to the very uniform nature of the sound power distribution of distributed mode loudspeaker panels.

Due to the electrically compatible nature of distributed mode speaker panels using electro-dynamic exciters, existing electronics and amplification may be used.

Due to the current manufacturing procedures adopted by vehicle manufacturers, they prefer to purchase fully functional pre-tested sub-assemblies. The above applications lend themselves to such preferred methods of manufacturing and sub-contracting.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
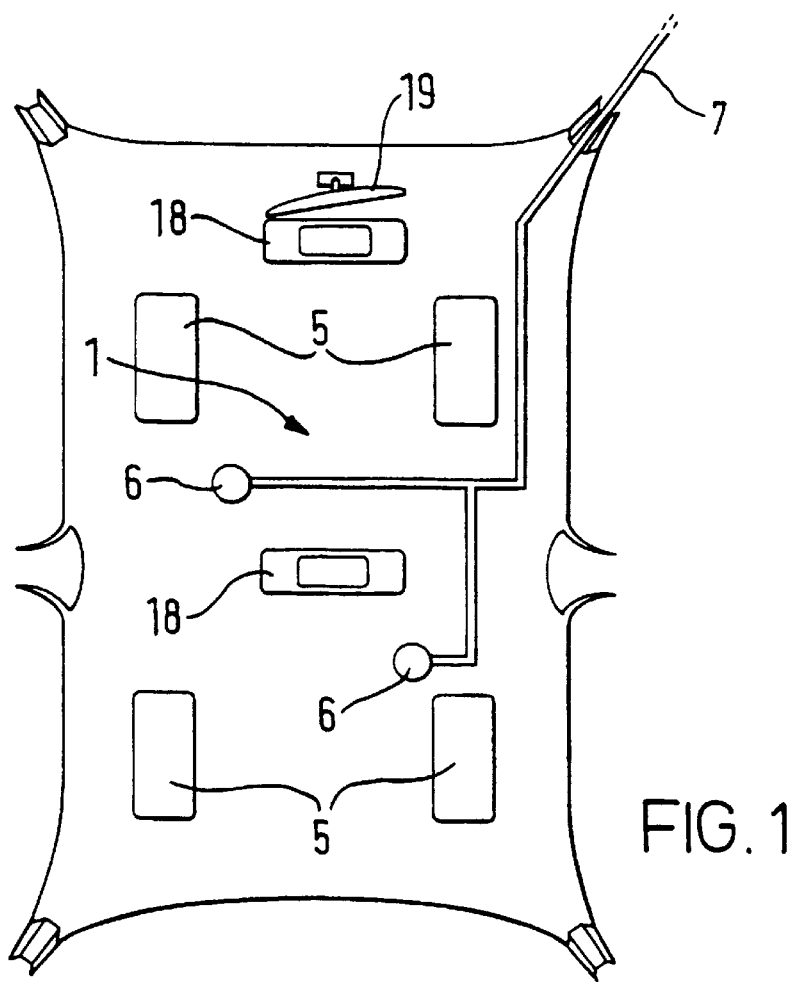
FIG. 1 is a plan view of a roof or headlining for an automobile, constructed in accordance with the present invention.
Figure 2:
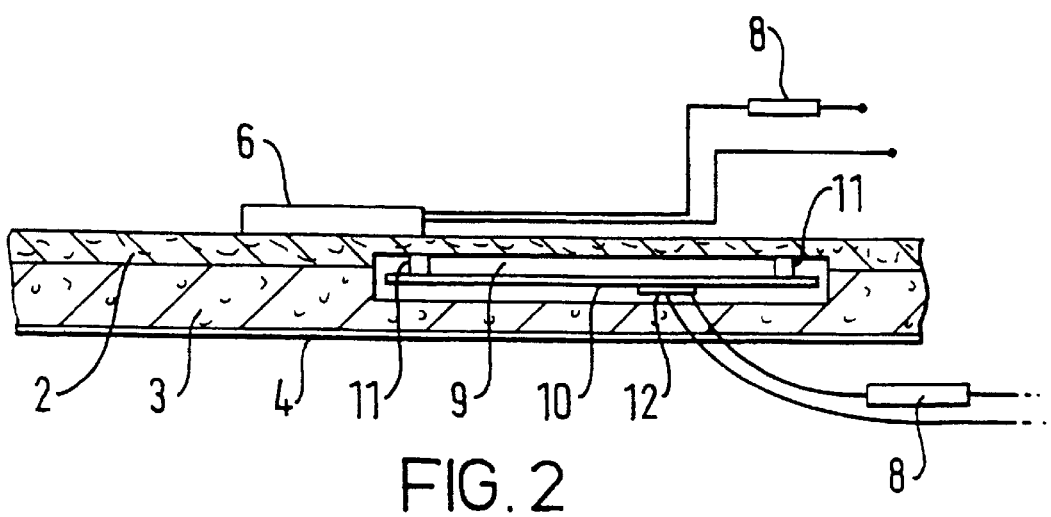
FIG. 2 is a partial cross-sectional side view of the headlining of FIG. 1.

In FIGS. 1 and 2 there is shown a roof or headlining (1) for an automobile (not shown) which headlining comprises a main body (2) of resin impregnated fibrous material which is formed to shape by moulding and which is covered on its under surface with a resilient foam layer (3), e.g. of plastics or rubber, which in turn is covered by a decorative skin layer (4) of textiles fabric or the like.

As shown, four resonant panel-form acoustic radiator loudspeakers (5) as described in International application WO97/09842 are provided inside the thickness of the headlining and are arranged in the headlining such that they are positioned generally above the heads of the occupants of the automobile. The four loudspeakers (5) are intended as mid/high frequency loudspeakers. In addition an opposed pair of vibration exciters are mounted directly on the body of the headlining, to excite the headlining at low frequencies in the manner of a subwoofer operating as a distributed mode acoustic radiator as described in parent application Ser. No. 08/707,012. The vibration exciters may be of the kind described in our copending application Ser. Nos. 09/011,773 09/011,770 and 09/011,831 and are preferably electrodynamic inertial devices. A wiring harness (7) providing electrical power to the various loudspeakers and other components such as interior lights (18) is integral with the headlining. It might be desirable to provide current limiters (8) in the wiring (7) to the loudspeakers to protect the exciters against overload. A rear view mirror (19) is shown mounted on the headlining.

As shown in FIG. 2, the mid/high frequency loudspeakers (5) are provided in cavities (9) formed in the thickness of the body (2) of the headlining and by locally reducing the thickness of the resilient foam layer (3) whereby the foam layer is acoustically transparent. Stiff lightweight generally rectangular panel monoliths (10), e.g. of fibre impregnated plastics forming resonant acoustic radiators and made in accordance with the teaching in parent application Ser. No. 08/707,012 are mounted in the respective cavities (9) on discrete resilient suspension elements (11), e.g. of a foamed elastomeric material which are mounted on the body and which are fixed to the panel (10) near to its edges. A vibration exciter (12) is mounted on the panel (10) to launch bending waves into the panel and is positioned on the panel as discussed in parent application Ser. No. 08/707,012. The exciters (12) may be electrodynamic and may be of the inertial variety.

Figure 3:
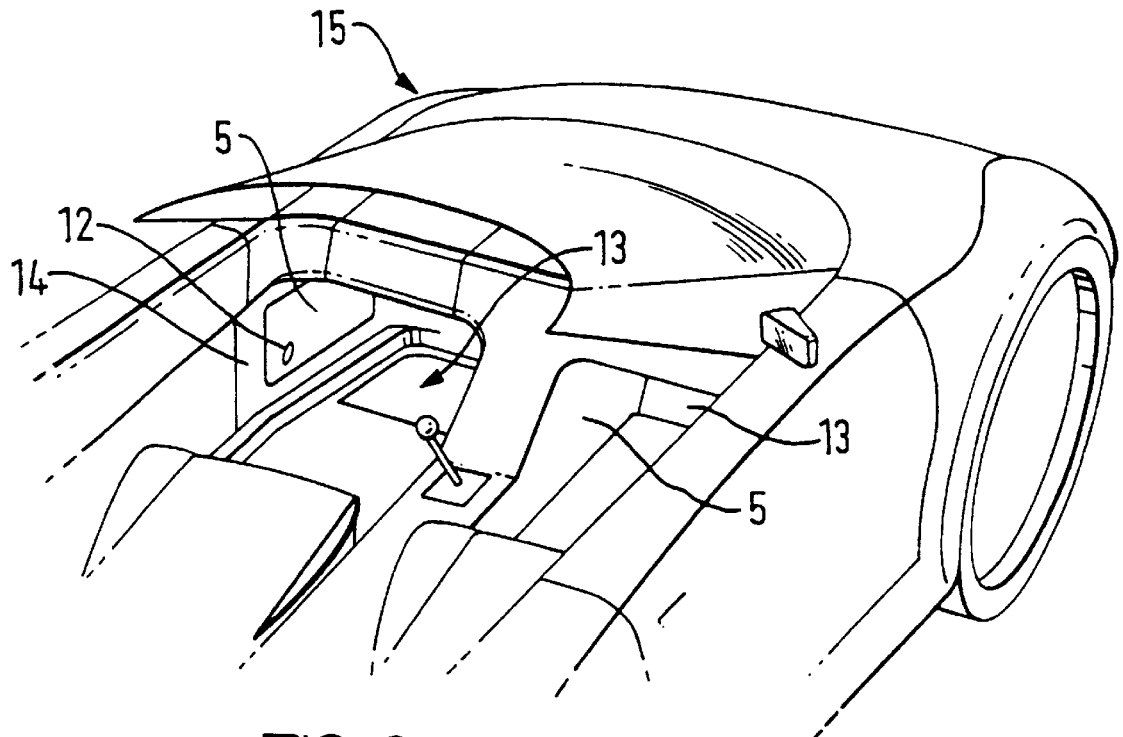
FIG. 3 is a perspective view of the front portion of an automobile.
Figure 4:
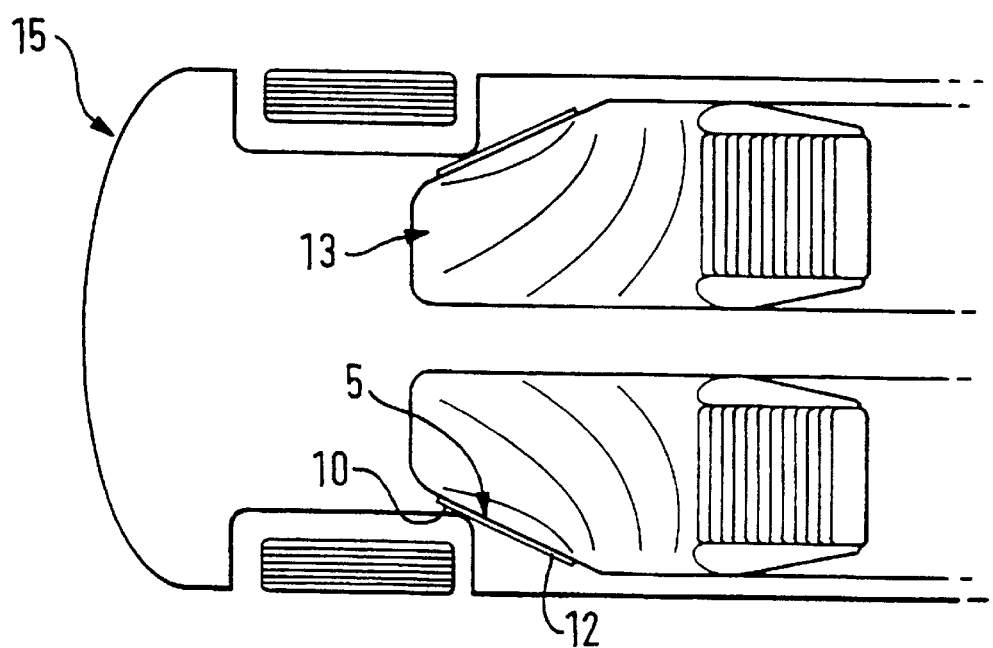
FIG. 4 is a plan view corresponding to FIG. 3.

FIGS. 3 and 4 show an automobile (15) with roof and roof lining omitted in the interests of clarity, and illustrate that acoustic radiator panel loudspeakers (5) of the kind described above are also provided in the interior lining (14) of the passenger footwells (13) and may benefit from such positioning since the partly enclosed volumes of such footwells may act as horns or resonators to enhance the acoustic signal. The radiators may be low frequency, i.e. subwoofer, loudspeakers.

Figure 5:
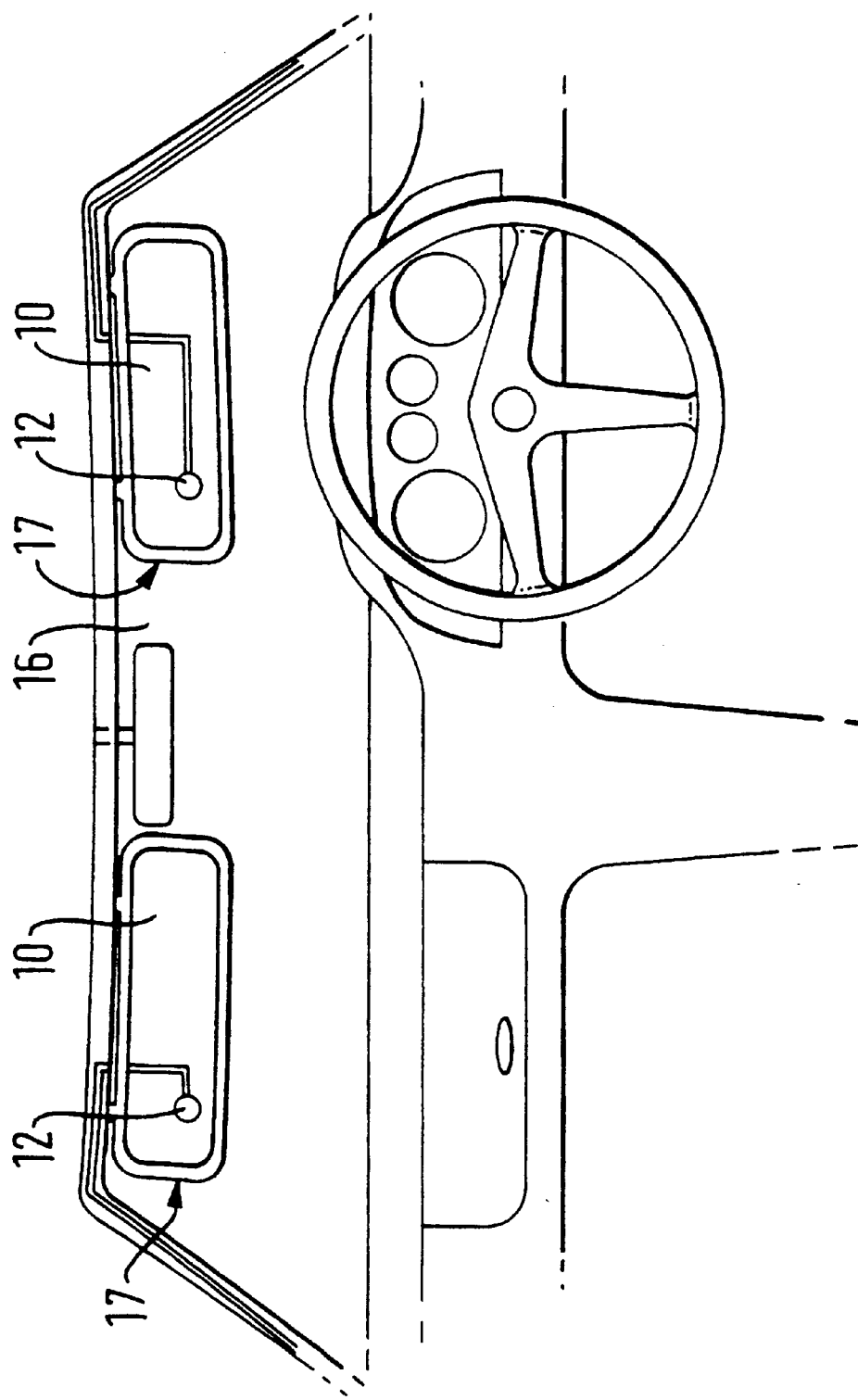
FIG. 5 is a view of part of the interior of an automobile.

In FIG. 5, an automobile (15) of the kind described above is additionally equipped with distributed mode acoustic radiator loudspeakers (5) integrated in sun visors (17) attached to the top of the automobile windshield (16). The sun visors (17) incorporate resonant panels (10) excited by vibration exciters (12) as described above. The panel form of a distributed mode acoustic radiator makes it particularly suitable for such a purpose. By careful balancing of sound levels, the visor sound source can be used to provide improved image steering and frontal localisation for front seated persons in the vehicle.

For rear passengers augmented localisation may be achieved by additional speaker elements working in addition to the main headlining/parcel shelf radiators: these may be incorporated in seat backs, headrests or restraints or door trim sections.

What is claimed is:

1. A vehicle having a passenger compartment comprising:

a vehicle headlining having selected values of certain physical parameters which enable the vehicle headlining to sustain and propagate input vibrational energy in a predetermined frequency range including at least low frequencies by the vehicle headlining when resonating having at least one site at which the number of vibrationally active resonance anti-nodes is relatively high; and at least one vibration exciter attached directly to the vehicle headlining at at least one of said sites, the exciter being capable of vibrating the vehicle headlining in the predetermined frequency range to couple to and excite at least the low-frequency resonant bending wave modes in the vehicle headlining and cause the vehicle headlining to resonate at low frequencies forming an acoustic radiator providing a bass acoustic output when resonating.

2. A vehicle according to claim 1, wherein the vehicle headlining has a resinated fibre structural base overlaid by acoustically porous thin foam and a decorative coating.

3. A vehicle according to claim 1, further comprising a mid/high frequency acoustic radiator carried by the headlining.

4. A vehicle component for a passenger compartment, comprising:

a lining member having selected values of certain physical parameters which enable the lining member to sustain and propagate input vibrational energy in a predetermined frequency range including at least low frequencies by the lining member when resonating having at least one site at which the number of vibrationally active resonance anti-nodes is relatively high; and at least one vibration exciter attached directly to the lining member at at least one of said sites, the exciter being capable of vibrating the lining member in the predetermined frequency range to couple to and excite at least the low-frequency resonant bending wave modes in the lining member and cause the lining member to resonate at low frequencies forming an acoustic radiator providing a bass acoustic output when resonating.

5. A vehicle component according to claim 4, wherein the lining member further comprises an integrally formed mid/high frequency acoustic radiator.

6. A vehicle component according to claim 4, wherein the lining member is a sun visor comprising an distributed mode acoustic radiator loudspeaker.

7. A vehicle component according to claim 4, wherein the lining member comprises an automobile footwell lining member.

8. A vehicle component according to claim 4, wherein the lining member is a shell for a passenger seat.

9. A vehicle component according to claim 8, wherein the shell comprises a head restraint and the acoustic radiator forms part of the head restraint.

10. A vehicle component according to claim 4, wherein the lining member is a headlining.

11. A vehicle component according to claim 10, wherein the headlining is formed with a cavity in which an acoustic radiator is resiliently mounted, and wherein the cavity is covered by a decorative facing.

* * * * *